(12) United States Patent
Shimohira

(10) Patent No.: US 9,030,709 B2
(45) Date of Patent: May 12, 2015

(54) INFORMATION PROCESSING APPARATUS, INFORMATION PROCESSING METHOD, AND COMPUTER READABLE RECORDING MEDIUM FOR PRINT CONTROL

(75) Inventor: Yoshihiko Shimohira, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 141 days.

(21) Appl. No.: 13/485,121

(22) Filed: May 31, 2012

(65) Prior Publication Data

US 2013/0016373 A1    Jan. 17, 2013

(30) Foreign Application Priority Data

Jul. 15, 2011    (JP) .................. 2011-157176

(51) Int. Cl.
*H04N 1/60* (2006.01)
*G06F 15/00* (2006.01)
*H04N 1/46* (2006.01)
*G06F 3/12* (2006.01)

(52) U.S. Cl.
CPC ........... *G06F 3/1206* (2013.01); *G06T 2210/62* (2013.01); *G06F 3/1208* (2013.01); *G06F 3/1244* (2013.01)

(58) Field of Classification Search
None
See application file for complete search history.

(56) References Cited

U.S. PATENT DOCUMENTS

| | | | |
|---|---|---|---|
| 6,515,675 B1 * | 2/2003 | Bourdev | 345/629 |
| 6,989,909 B2 * | 1/2006 | Oki | 358/1.15 |
| 7,583,410 B1 * | 9/2009 | Anup et al. | 358/2.1 |
| 7,706,001 B2 * | 4/2010 | Takagi | 358/1.13 |
| 2002/0051193 A1 * | 5/2002 | Oki | 358/1.15 |
| 2006/0197969 A1 * | 9/2006 | Takagi | 358/1.13 |
| 2006/0279758 A1 * | 12/2006 | Myoki | 358/1.13 |
| 2007/0133019 A1 * | 6/2007 | Hill et al. | 358/1.9 |
| 2010/0079783 A1 * | 4/2010 | Naganuma et al. | 358/1.13 |
| 2010/0157348 A1 * | 6/2010 | Takagi | 358/1.13 |
| 2011/0122437 A1 | 5/2011 | Shimohira | |

FOREIGN PATENT DOCUMENTS

JP    07-154588 A    6/1995
JP    2002-007102 A    1/2002

* cited by examiner

*Primary Examiner* — Richard Zhu
(74) *Attorney, Agent, or Firm* — Harness, Dickey & Pierce

(57) ABSTRACT

An information processing apparatus includes a drawing receiving unit to receive a page start command and a drawing command from an OS, a transparency processing unit to generate a bitmap upon receiving the page start command, to alpha blend a first image with a second image existing on the bitmap to generate a blended image upon receiving the drawing command that includes the first image with an alpha channel, and to duplicate the alpha blended image, and a drawing processing unit to convert the drawing command that includes the first image with the alpha channel, into a print command to draw the duplicated alpha blended image.

15 Claims, 11 Drawing Sheets

FIG.7

```
JobStart
PageStart(PAGE SIZE)
SetColor(YELLOW)
DrawRect(PRINT COORDINATE)―――――――41
SetColor(RED)
PutString(PRINT COORDINATE, SIZE)―――42
SetColor(ORANGE)
FillPloyBezier(PRINT COORDINATE)―――43
Bitmap(24BPP, PRINT COORDINATE)―――44
```

INFORMATION PROCESSING APPARATUS, INFORMATION PROCESSING METHOD, AND COMPUTER READABLE RECORDING MEDIUM FOR PRINT CONTROL

BACKGROUND OF THE INVENTION

1. Field of the Invention

The present invention relates to an information processing apparatus, an information processing method and a computer readable medium for print control that control a transparency process.

2. Description of the Related Art

Conventionally, an art of alpha blending is known that combines two images by using a coefficient (i.e., alpha value). This alpha value generally shows opacity of a pixel. For example, the alpha value is held in auxiliary data provided separately from color representation data for each pixel. The auxiliary data are generally called "alpha channel."

FIG. 1 is a sequence diagram showing an example of print control processing where a PDL (i.e., Print Description Language) supports a bitmap with an alpha channel.

An application draws the bitmap with the alpha channel (which is a transmissive image), and outputs the transmissive image to an OS (i.e., Operating System) (S101). A printer driver receives the bitmap with the alpha channel (S102), and sends the bitmap with the alpha channel still attached (S103).

A printer performs a transparency process and printing based on the alpha channel because the printer driver supports the bitmap with the alpha channel.

On the other hand, sometimes the printer driver does not support the bitmap with the alpha channel. At this time, the printer driver sends the OS a notice being unable to process (i.e., not to support) the bitmap with the alpha channel. The OS outputs the drawing command in a format that does not need the alpha blending.

FIG. 2 is a sequence diagram showing an example of a print control process where a PDL that does not support a bitmap with an alpha channel is used.

Because a printer in this example does not support a bitmap with a alpha channel, the printer cannot receive the bitmap with the alpha channel from a printer driver. Therefore, the printer driver gives the OS a notice not to support the bitmap with the alpha channel.

An application draws a bitmap with a alpha channel (i.e., transmissive image), and outputs the transmissive image to the OS (S201).

The OS converts the transmissive image into a format that does not require the alpha blending, if the printer does not support the bitmap with the alpha channel (S202). The OS outputs a drawing command for the converted bitmap (which is a normal image) (S203). Here, in most cases, the drawing command output to the printer driver becomes a drawing command that uses a normal bitmap format.

The printer driver receives the drawing command that does not need the alpha blending, converts the drawing command into a PDL command, and sends the PDL command to the printer (S204).

Moreover, the printer that cannot perform the alpha blending process cannot implement a proper transparency process if the printer receives a drawing command of the bitmap with the alpha channel from the printer driver.

In contrast, Japanese Laid-open Patent Application Publication No. 2002-7102 (which is hereinafter called "Patent Document 1") discloses an art that replaces an alpha blending specification by area information on the printer side depending on an alpha value, and converts a drawing command into a drawing command that performs processing depending on the area information.

However, in the conventional art, sometimes a bitmap, which is drawn by the printer, by the drawing command that does not need the alpha blending may differ from a bitmap displayed on an application screen.

In other words, in the conventional art, the transparency process is just performed improperly, and a transmissive image that the application expects cannot be drawn properly. For example, if the alpha value differs for each pixel, close alpha blending cannot be performed by the conventional art.

SUMMARY OF THE INVENTION

Accordingly, embodiments of the present invention may provide a novel and useful information processing apparatus, information processing method and computer readable recording medium for print control solving or reducing one or more of the above-described problems.

More specifically, the embodiments of the present invention may provide an information processing apparatus, an information processing method and a computer readable medium to be able to print a proper alpha blended image by appropriately performing an alpha blending process on a printer driver side even if the information processing apparatus, the information processing method and the computer readable medium are adapted to a printer that does not support the alpha blending process.

According to one embodiment of the present invention, an information processing apparatus is provided, the apparatus including:

a drawing receiving unit to receive a page start command and a drawing command from an OS;

a transparency processing unit to generate a bitmap upon receiving the page start command, to alpha blend a first image with a second image existing on the bitmap to generate a blended image upon receiving the drawing command that includes the first image with an alpha channel, and to duplicate the alpha blended image; and a drawing processing unit to convert the drawing command that includes the first image with the alpha channel, into a print command to draw the duplicated alpha blended image.

According to another embodiment of the present invention, a non-transitory computer readable recording medium storing a print control program to cause a computer to perform the steps of:

(A) receiving a page start command and a drawing command from an OS;

(B) generating a bitmap upon receiving the page start command;

(C) alpha blending a first image with a second image existing on the bitmap to generate a alpha blended image upon receiving the drawing command that includes the first image with an alpha channel;

(D) duplicating the alpha blended image; and (E) converting the drawing command that includes the first image with the alpha channel into a print command to draw the duplicated alpha blended image.

According to another embodiment of the present invention, an information processing method is provided, the method including the steps of:

(A) receiving a page start command and a drawing command from an OS;

(B) generating a bitmap upon receiving the page start command;

(C) alpha blending a first image with a second image existing on the bitmap to generate a alpha blended image upon receiving the drawing command that includes the first image with an alpha channel;

(D) duplicating the alpha blended image; and (E) converting the drawing command that includes the first image with the alpha channel into a print command to draw the duplicated alpha blended image.

Other objects, features and advantages of the present invention will become more apparent from the following detailed description when read in conjunction with the accompanying drawings.

BRIEF DESCRIPTION OF THE DRAWINGS

FIG. 7 is a diagram showing an example of a print command;

DETAILED DESCRIPTION OF THE PREFERRED EMBODIMENTS

A description is given, with reference to the accompanying drawings, of respective embodiments of the present invention.

First Embodiment

System and Hardware

Figure 1:
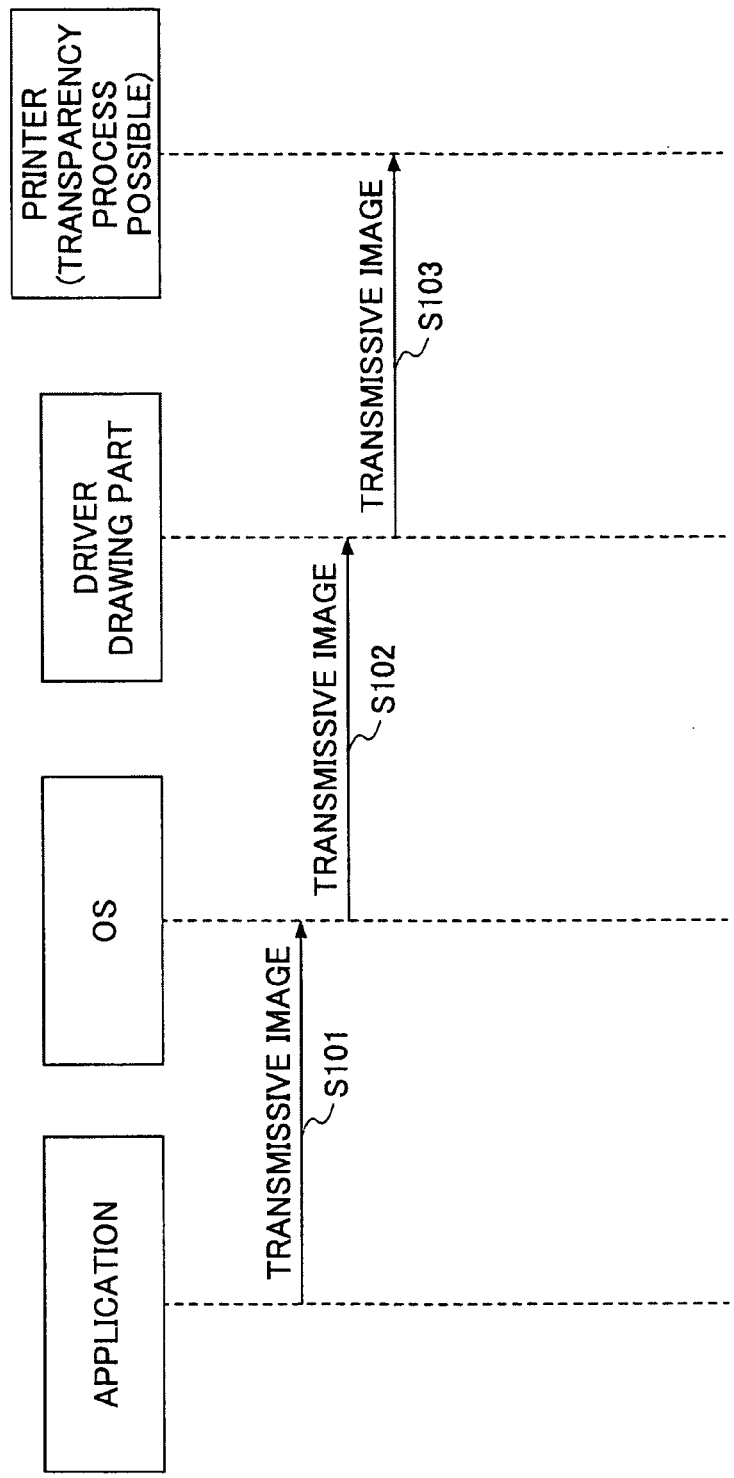
FIG. 1 is a sequence diagram showing an example of a print control process where a PDL supporting a bitmap with an alpha channel is used.
Figure 3:
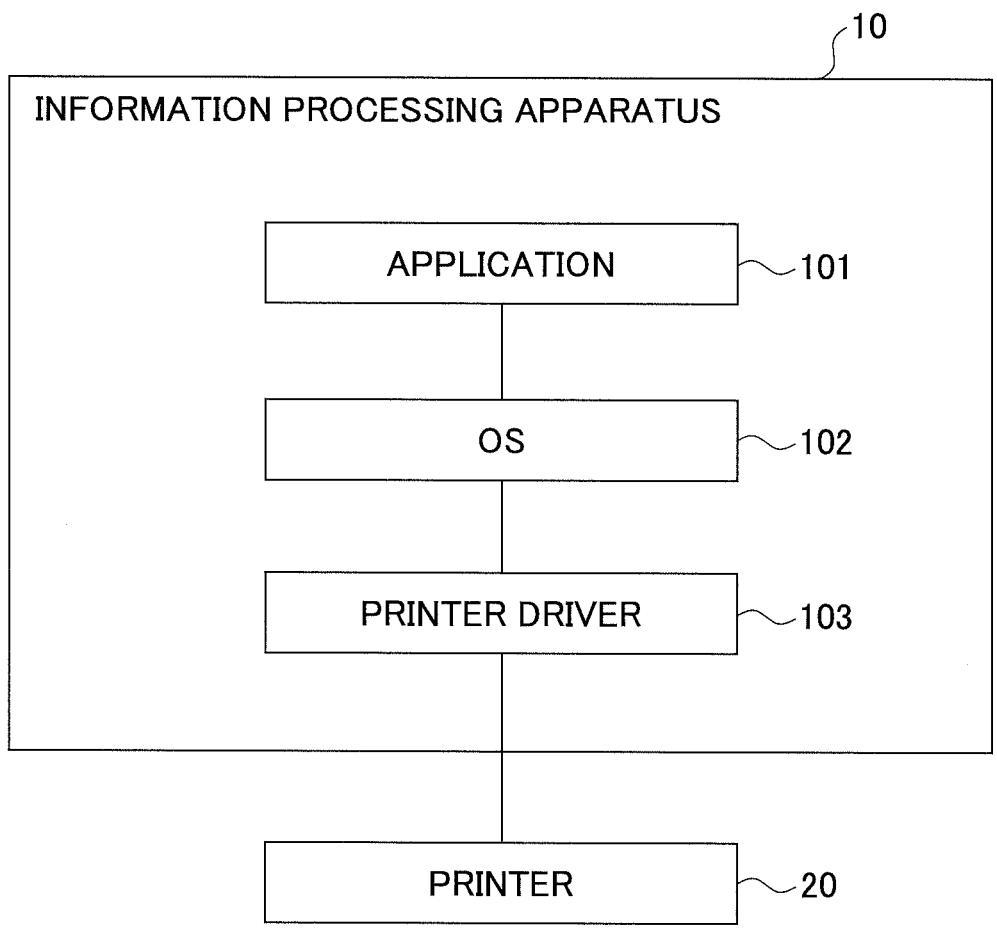
FIG. 3 is a diagram showing an example of a print control system in a first embodiment.

FIG. 3 is a diagram showing an example of a print control system in a first embodiment. As shown in FIG. 3, in the print control system, an information processing apparatus 10 and a printer 20 are connected to each other through a network. The number of devices connected is not limited to the example shown in FIG. 1.

The information processing apparatus 10 shown in FIG. 3 includes an application 101 such as Word, an OS 102 such as Windows™, and a printer driver 103 that performs print control.

The application 101 draws contents to be printed by using an API (Application Program Interface) that the OS 102 prepares.

The OS 102 converts a drawing command from the application 101 into a drawing command (which is DDI (Device Driver Interface)) for the printer driver 103.

The printer driver 103 converts the drawing command received from the OS 102 into a print command (i.e., PDL command) that the printer 20 can interpret, and sends the print command to the printer 20.

The printer 20 analyzes the received print command (i.e., PDL command), and prints an image in accordance with the print command.

Figure 4:
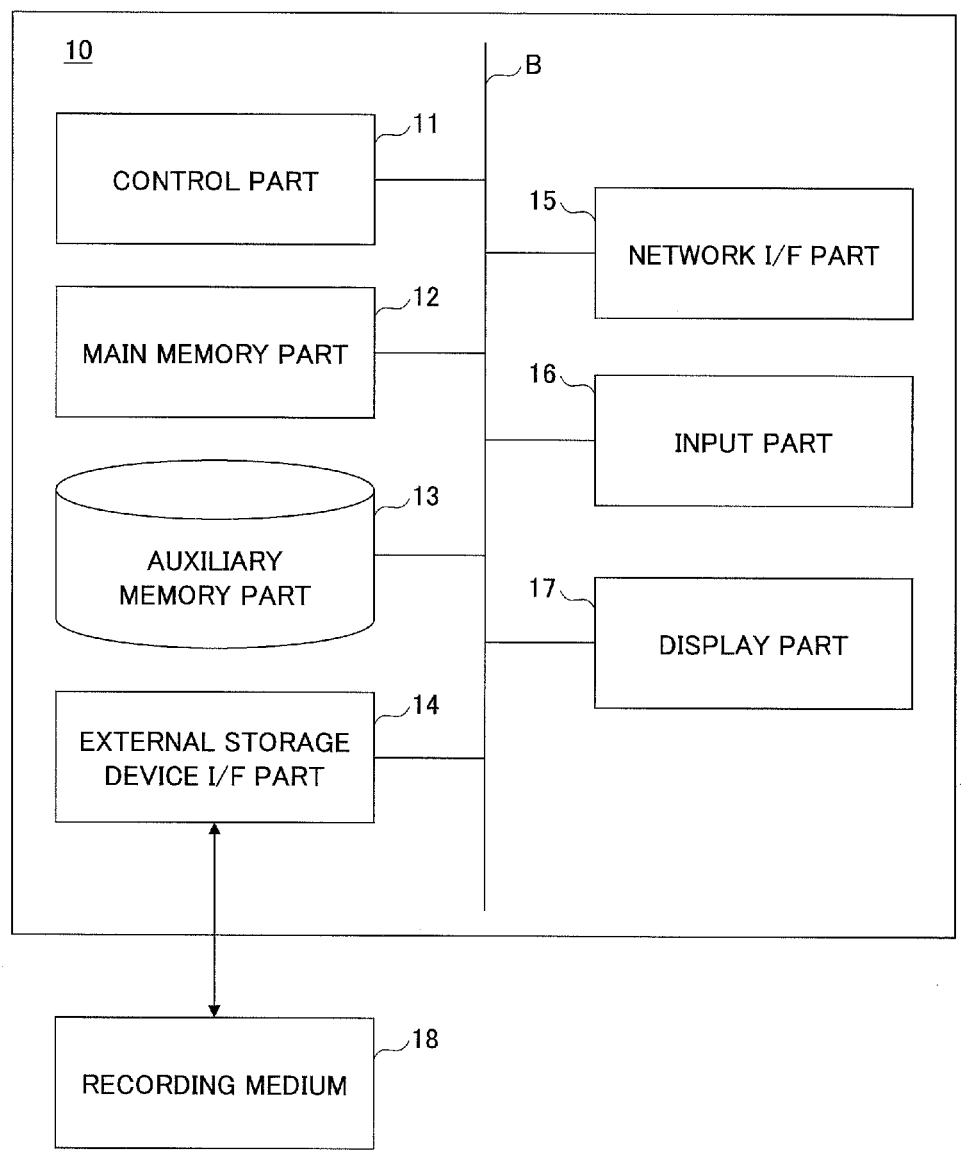
FIG. 4 is a block diagram showing an example of hardware of an information processing apparatus in the first embodiment.

Next, a description is given about hardware of the information processing apparatus 10 in the first embodiment. FIG. 4 is a block diagram showing an example of the hardware of the information processing apparatus 10 in the first embodiment. As shown in FIG. 4, the information processing apparatus 10 includes a control part 11, a main memory part 12, an auxiliary memory part 13, an external storage device I/F part 14, a network I/F part 15, an input part 16, and a display part 17. These respective components are connected to each other through a bus B, making data transmittable and receivable.

The control part 11 is a CPU (Central Processing Unit) that performs control of each device, an operation of data, and processing in a computer. Moreover, the control part 11 is an arithmetic unit that runs a program stored in the main memory part 12, which receives data from an input unit or a memory unit and outputs the data to an output unit or a memory unit after operating and processing the data.

The main memory part 12 is a ROM (Read-Only Memory) or a RAM (Random Access Memory) and the like, and is a memory unit that stores or temporarily retains a program or data, such as an OS and an application software, to be a basic software that the control part 11 runs.

The auxiliary memory part 13 is a HDD (Hard Disk Drive) and the like, and is a memory unit that stores data related to the application software and the like.

The external storage device I/F part 14 is an interface between a recording medium 18 (e.g., flush memory and the like) and the information processing apparatus 10, connected through a data transmission channel such as a USB (Universal Serial Bus).

Furthermore, a predetermined program is stored in the recording medium 18, and the program stored in this recording medium 18 is installed in the information processing apparatus 10 through the external storage device I/F part 14. The installed predetermined program can be implemented by the information processing apparatus 10.

The network I/F part 15 is an interface between the information processing apparatus 10 and peripherals that are connected through a network such as a LAN (Local Area Network), and/or a WAN (Wide Area Network) that are constructed by a data transmission channel such as wired and/or wireless lines and the like, and include a communication function.

The input part 16 includes cursor keys, a keyboard including number input keys and various function keys, a mouse to perform a selection of keys and the like on the display screen of the display part 17, and a slide pad (i.e., a touch pad) and the like. In addition, the input part 16 is a user interface to allow a user to provide an operation command for the control part 11 and to input data.

The display part 17 includes a CRT (Cathode Ray Tube), an LCD (Liquid Crystal Display) and the like, and displays display data input from the control part 17.

<Module Configuration>

Figure 5:
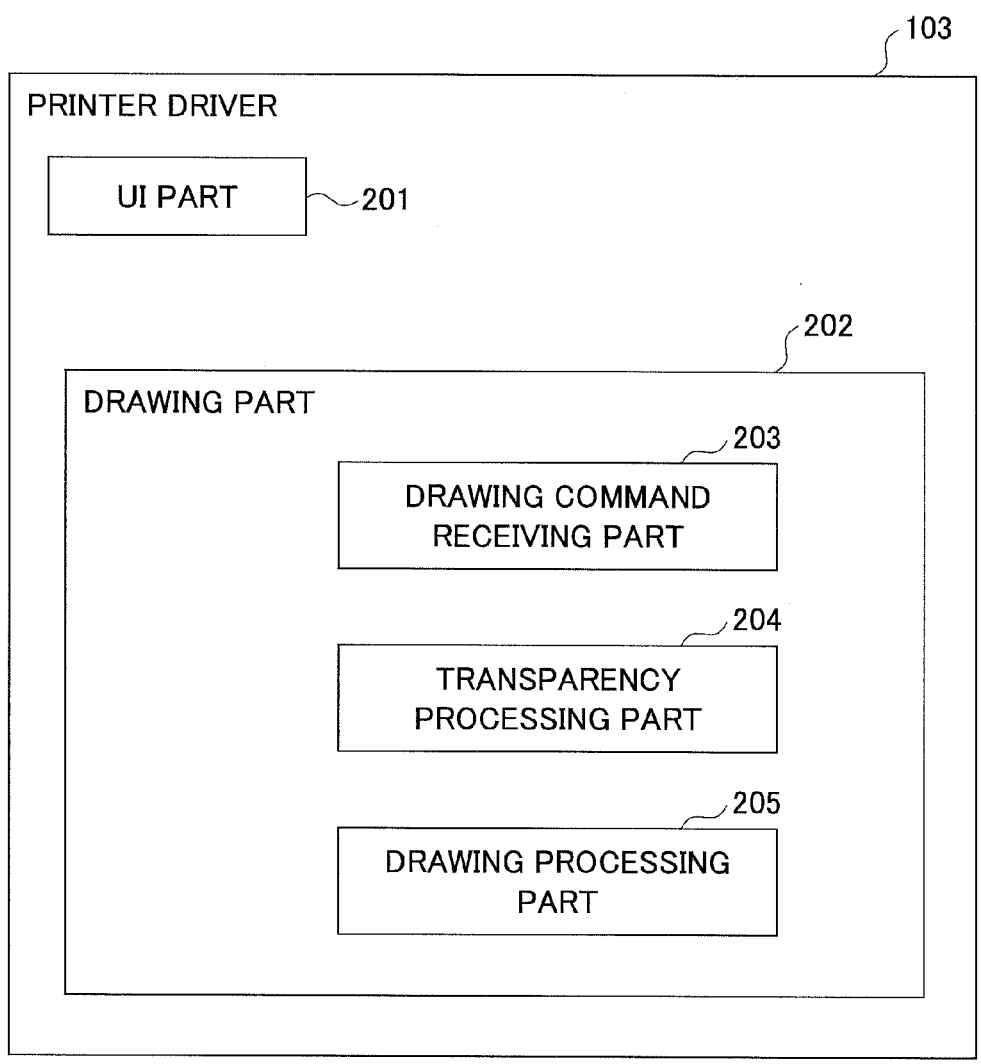
FIG. 5 is a diagram showing a module configuration of a printer driver in the first embodiment.

Next, a description is given about a module configuration of the information processing apparatus 10. FIG. 5 is a diagram showing an example of a module configuration of the printer driver 103 in the first embodiment. The printer driver 103, for example, functions for allowing the control part 11 to run a print control program stored in the auxiliary memory part 13.

The printer driver 103 includes a UI (User Interface) part 201 and a drawing part 202. The drawing part 202 includes a drawing command receiving part 203, a transparency processing part 204, and a drawing processing part 205.

The UI part 201 provides a user with a UI for print settings. Moreover, the UI part 201 conducts a negotiation related to the print settings with the application 101.

The drawing command receiving part 203 receives a page start command and a drawing command from the OS 102, and outputs the received page start command and drawing command to the drawing processing part 205. The page start command is a command to indicate a start of a print page.

The drawing processing part 205 outputs the page start command and the drawing command obtained from the drawing command receiving part 203 to the transparency processing part 204. Furthermore, the drawing processing part 205 converts the drawing command obtained from the drawing command receiving part 203 into a print command (i.e., PDL command), and sends the print command to the printer 20.

In addition, if the obtained drawing command is a drawing command of a bitmap with an alpha channel, the drawing processing part 205 converts the obtained drawing command into a print command to draw a transmissive area duplicated by the transparency processing part 204 described below. Hereinafter, the bitmap with the alpha channel is also called an "image with the alpha channel" or a "transmissive image."

The transparency processing part 204 generates a 24 BPP (i.e., Bits Per Pixel) bitmap if receiving the page start command from the drawing processing part 205. The generated bitmap is stored, for example, in an internal memory of the transparency processing part 204. Moreover, the transparency processing part 204 performs drawing on the bitmap in accordance with the drawing command.

The transparency processing part 204 retains a background color necessary for the bitmap with the alpha channel. The transparency processing part 204 performs alpha blending and drawing on the bitmap if the drawing command is a drawing command of the bitmap with the alpha channel. The transparency processing part 204 duplicates a transmissive area showing an alpha blended area.

By doing this, since the printer driver 103 sends the printer 20 a print command for the area where the alpha blending is already performed, the printer 20 can print an appropriately alpha blended image even if the printer 20 does not support the alpha blending process.

<Operation>

Figure 6:
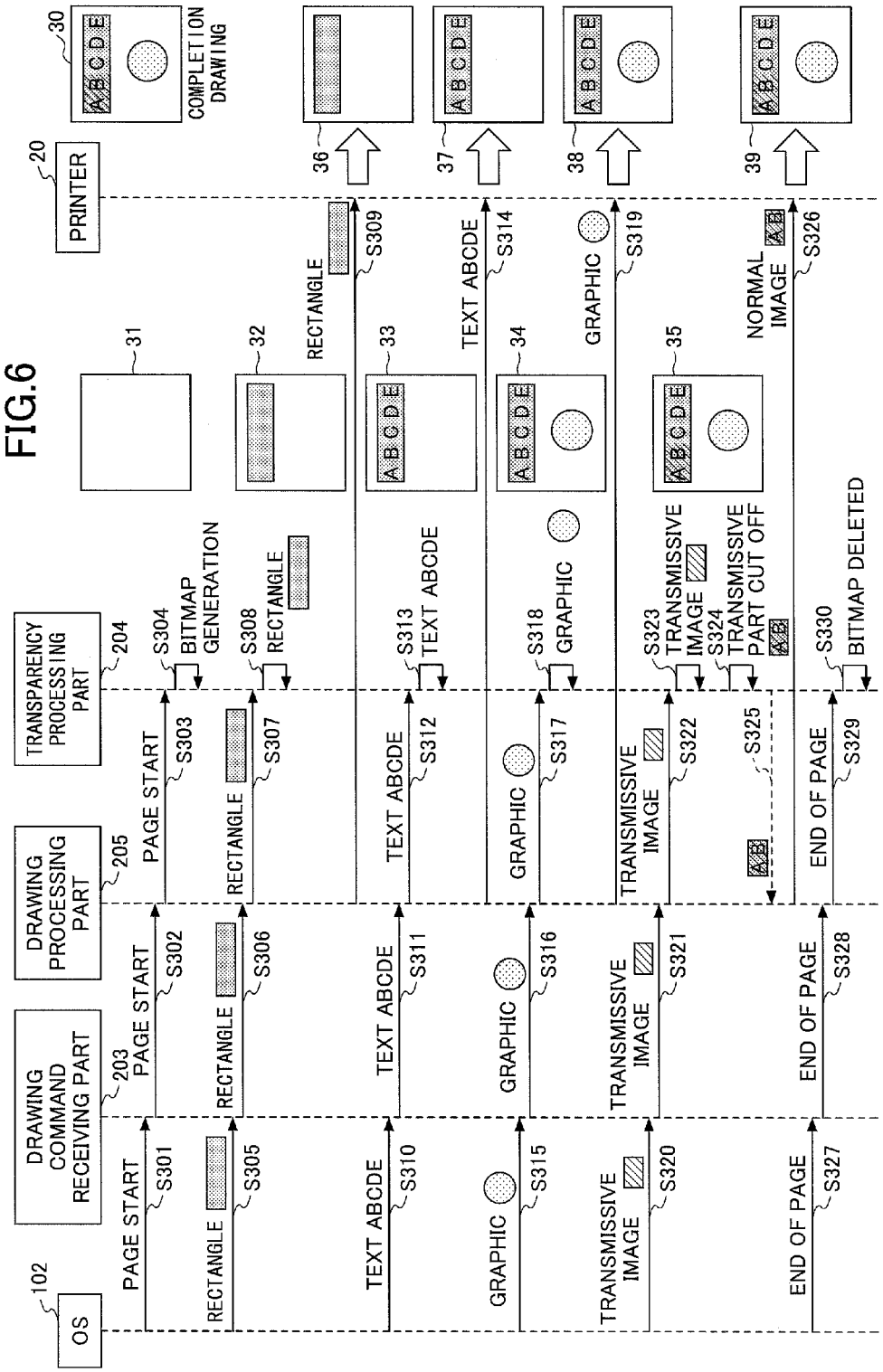
FIG. 6 is a sequence diagram showing an example of a print control process in the first embodiment.

Next, a description is given about an operation of the information processing apparatus 10 in the first embodiment. FIG. 6 is a sequence diagram showing an example of a print control process in the first embodiment. The print control process shown in FIG. 6 is a process to obtain a printing result properly processed by the alpha blending by using the printer driver 103 of the PDL that does not support the bitmap with the alpha channel.

The sequence diagram shown in FIG. 6 depicts images drawn by the transparency processing part 204 and the printer 20 respectively.

In step S301, the OS 102 sends a page start command to the drawing command receiving part 203.

In step S302, the drawing command receiving part 203 receives the page start command, and sends the page start command to the drawing processing part 205.

In step S303, the drawing processing part 205 sends the obtained page start command to the transparency processing part 204.

In step S304, the transparency processing part 204 generates a bitmap corresponding to a page size if obtaining the page start command. The bitmap is, for example, a 24 BPP bitmap. A bitmap 31 is an image that is generated at this time.

In step S305, the OS 102 sends a drawing command to draw a rectangle (e.g., a yellow rectangle) to the drawing command receiving part 203.

In step S306, the drawing command receiving part 203 receives the drawing command to draw the rectangle, and sends the drawing command to draw the rectangle to the drawing processing part 205.

In step S307, the drawing processing part 205 sends the obtained drawing command to draw the rectangle to the transparency processing part 204.

In step S308, the transparency processing part 204 draws a rectangle on the bitmap if obtaining the drawing command to draw the rectangle. A bitmap 32 is an image of a rectangle drawn this time.

In step S309, the drawing processing part 205 converts the obtained drawing command (to draw the rectangle) into a print command (i.e., PDL command), and sends the print command to the printer 20. A bitmap 36 is an image of the rectangle drawn by the print command in step S309.

In step S310, the OS 102 sends a drawing command to draw text (e.g., red text "ABCDE") to the drawing command receiving part 203.

In step S311, the drawing command receiving part 203 receives the drawing command to draw the text, and sends the drawing command to draw the text to the drawing processing part 205.

In step S312, the drawing processing part 205 sends the obtained drawing command to draw the text to the transparency processing part 204.

In step S313, the transparency processing part 204 draws the text on the bitmap 32 if receiving the drawing command to draw the text. A bitmap 33 is an image of the text drawn this time on the bitmap 32.

In step S314, the drawing processing part 205 converts the obtained drawing command (to draw the text) into a print command (i.e., PDL command), and sends the print command to the printer 20. A bitmap 37 is an image drawn by the print command in step S314, drawn on a bitmap 36.

In step S315, the OS 102 sends a drawing command of a graphic (e.g., orange circle) to the drawing command receiving part 203.

In step S316, the drawing command receiving part 203 receives the drawing command of the graphic, and sends the drawing command of the graphic to the drawing processing part 205.

In step S317, the drawing processing part 205 sends the obtained drawing command of the graphic to the transparency processing part 204.

In step S318, the transparency processing part 204 draws a graphic on the bitmap 33 if receiving the drawing command of the graphic. A bitmap 34 is an image of the graphic drawn this time, on the bitmap 33.

In step S319, the drawing processing part 205 converts the obtained drawing command of the graphic into a print command (i.e., PDL command), and sends the print command to the printer 20. A bitmap 38 is an image of the graphic drawn by the print command in step S319, drawn on the bitmap 37.

In step S320, the OS 102 sends a drawing command of a bitmap with an alpha channel (e.g., transmissive image of 50% transmittance on the text "AB") to the drawing command receiving part 203.

In step S321, the drawing command receiving part 203 receives the drawing command of the bitmap with the alpha channel, and sends the drawing command of the bitmap with the alpha channel to the drawing processing part 205.

In step S322, the drawing processing part 205 sends the obtained drawing command of the bitmap with the alpha channel to the transparency processing part 204.

In step S323, the transparency processing part 204 alpha blends a transmissive image with the bitmap 34 and performs drawing if obtaining the drawing command of the bitmap with the alpha blending. A bitmap 35 is an image of the transmissive image alpha blended with the bitmap 34 (transparency processing) drawn this time. The bitmap 35, after being alpha blended, is a normal image without the alpha channel.

In step S324, the transparency processing part 204 duplicates the transmissive area showing an alpha blended area, and crops the transmissive area.

In step S325, the transparency processing part 204 outputs the duplicated and cropped transmissive area to the drawing processing part 205. The transmissive area is a normal image without the alpha channel.

In step S326, the drawing processing part 205 converts data of the obtained transmissive area into a print command to draw this transmissive area, and sends the print command to the printer 20. A bitmap 39 is an image that is drawn by the print command in step S326, and the transmissive area is drawn on the bitmap 38.

In addition, if the drawing command obtained from the OS 102 includes a clip range, the drawing processing part 205 also converts the clip range into the print command and sends the print command to the printer 20. The clip range is an area that specifies an effective drawing area. By providing the clip area, a variety of shape of the transmissive area becomes printable, not just the rectangular area.

In step S327, the OS 102 sends an end-of-page command to the drawing command receiving part 203.

In step S328, the drawing command receiving part 203 sends the obtained end-of-page command to the drawing processing part 205.

In step S329, the drawing processing part 205 sends the obtained end-of-page command to the transparency processing part 204.

In step S330, the transparency processing part 204 cut off the bitmap that the transparency processing part 204 has drawn.

By doing this, the printer 20 that does not support the alpha blending process can obtain a printing result including a properly alpha blended area.

Here, an image 30 shows a printing result that the application 101 expects. An image 39 of a printing result can be said to be substantially the same as the image 30, and the printer 20 can print an alpha blended image correctly.

Here, the transparency processing part 204 does not perform the duplication process in step S324 to the bitmap with the alpha channel obtained in step S322 if the alpha channel shows opacity.

In this case, in step S326, the drawing processing part 205 does not convert the drawing command obtained from the OS 102 into the print command to draw the duplicated transmissive area, but converts a drawing command of a bitmap where the alpha channel is removed from the drawing command obtained from the OS 102 into a print command.

By doing this, the printer driver 103 can omit the duplicating and cropping process in a case of a non-transparent bitmap (image) even with the alpha channel.

<Print Command>

Next, a description is given about the print command (i.e., PDL command) converted by the drawing processing part 205. FIG. 7 is a diagram showing an example of the print command. A print command 41 shown in FIG. 7 corresponds to the print command of step S309 shown in FIG. 6, and a print command 42 corresponds to the print command in step S314. A print command 43 corresponds to the print command in step S319, and a print command 44 corresponds to the print command in step S326.

Text in brackets of the print command shown in FIG. 7 show examples of parameters. Here, the print command 44 shown in FIG. 7 is the print command showing the transmissive area after being alpha blended (i.e., a normal image).

As discussed above, according to the first embodiment, by properly performing the alpha blending process on the printer driver side, even the printer that does not support the alpha blending process can print a proper alpha blended image. Moreover, according to the first embodiment, a case where an alpha value is different for each pixel and the like can be dealt with. Furthermore, according to the first embodiment, both RAW data and EMF data can be dealt with.

Second Embodiment

Next, a description is given about a print control system in the second embodiment. In the second embodiment, an area to be alpha blended is specified by using a print processor, and the printer driver generates a bitmap only for the specific area and performs drawing. By doing this, a memory area used to store a bitmap in order to perform the alpha blending can be reduced.

Since the system configuration and the hardware configuration are similar to the first embodiment, the descriptions are omitted.

<Module>

Figure 8:
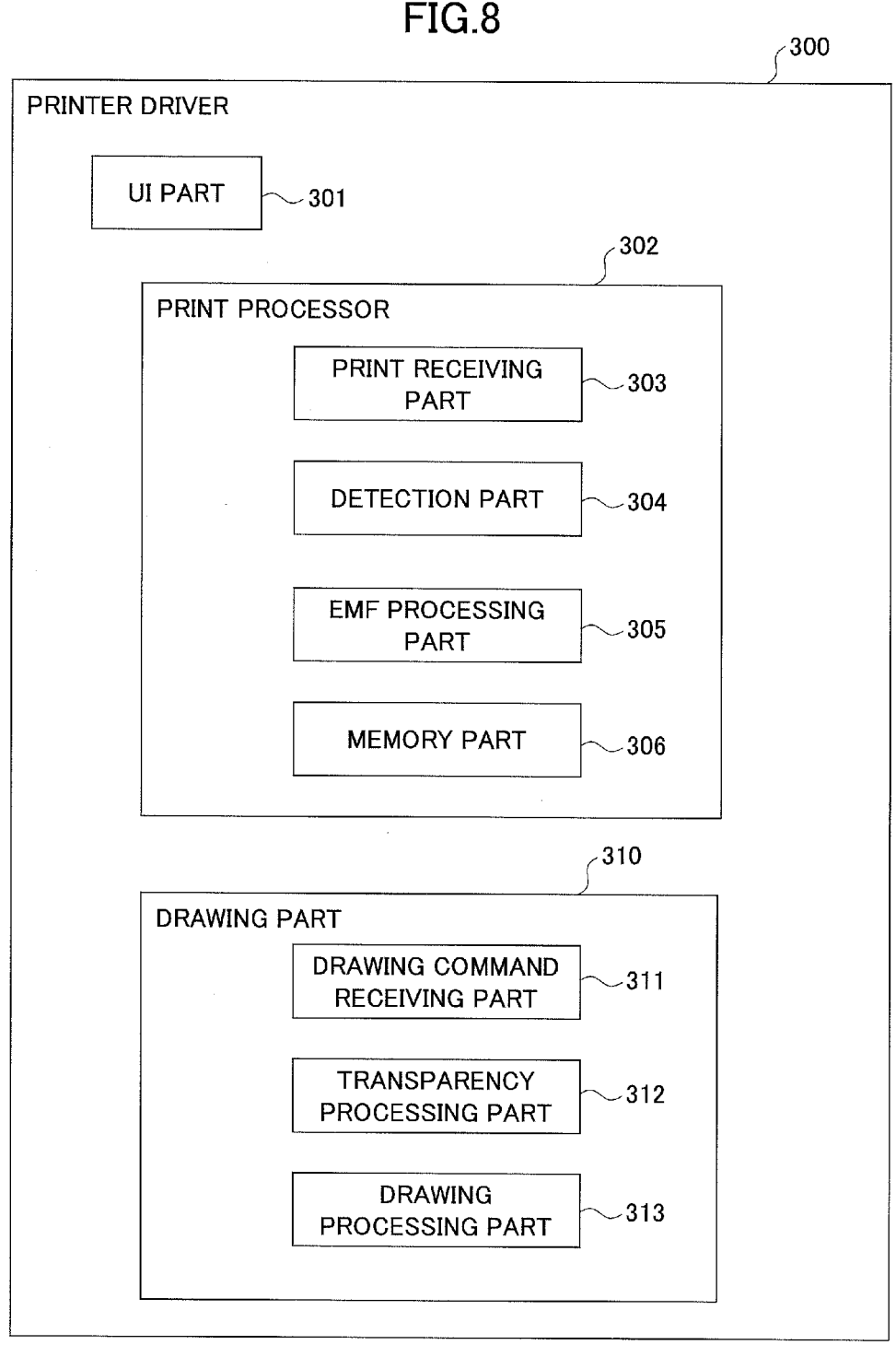
FIG. 8 is a block diagram showing an example of a module configuration of a printer driver in a second embodiment.

FIG. 8 is a block diagram showing an example of a printer driver 300 in the second embodiment. The printer driver 300 shown in FIG. 8 includes a UI part 301, a print processor 302, and a drawing part 310. The UI part 301 has a function similar to that of the first embodiment.

The print processor 302 receives a print command from the OS 102, parses EMF (Enhanced MetaFile) data, and performs imposition processing and the like. The print processor 302 includes a print receiving part 303, a detection part 304, an EMF processing part 305, and a memory part 306.

The print receiving part 303 receives a print command from the OS 102 in an EMF data format, and requests the EMF processing part 305 to perform an EMF process.

The EMF processing part 305, based on the EMF data, if necessary, performs the imposition process such as aggregation, enlargement and the like. In addition, the EMF processing part 305 sends a transmission detection command to the detection part 304.

The detection part 304 detects an alpha blending command from the EMF data if obtaining the transmission detection command from the EMF processing part 305. The detection part 304, if an alpha blending command is included in the EMF data, stores drawing information such as a print location, a width, and a height of the bitmap with the alpha channel, and area information including a page number in the memory part 306. In other words, the area information is information relating to the area to be alpha blended.

The detection part 304 stores, if detecting plural alpha blending commands, the area information corresponding accordingly.

The detection part 304, if the imposition process is performed by the EMF processing part 305 and a layout of the page is changed, stores area information of the transmissive area after the layout change (i.e., the imposition process).

Figure 9:
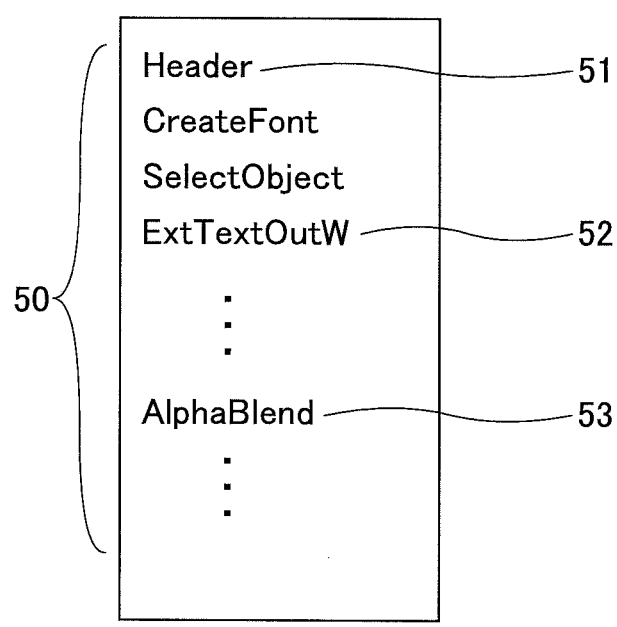
FIG. 9 is a diagram showing an example of EMF data.

FIG. 9 is a diagram showing an example of EMF data. A part 50 of the EMF data shown in FIG. 9 shows an API (Application Program Interface) that the application 101 has called. In this part 50, a parameter (e.g., a coordinate and the like) specified by an argument are also stored.

The EMF data include a header 51, a text drawing command 52, and a transmissive image drawing command (i.e., alpha blending command) 53. The detection part 304 detects that there is an alpha blending command if the transmissive image drawing command 53 is included in the EMF data.

Returning to FIG. 8, the memory part 306 stores area information corresponding to the alpha blending command detected by the detection part 304. For example, the memory part 306 stores one or more areas of the bitmap with the alpha blending. The memory 306 may reside outside of the printer processor 302.

The drawing part 310 includes a drawing command receiving part 311, a transparency processing part 312, and a drawing processing part 313. Since the drawing command receiving part 311 and the drawing processing part 313 have functions similar to those of the first embodiment, the descriptions are omitted.

The transparency processing part 312, if obtaining a page start command, obtains area information from the memory part 306, and generates a bitmap with a size that corresponds to area information. Moreover, if there are plural pieces of area information, the transparency processing part 312 generates a bitmap of the plural areas. Furthermore, if the areas shown by the area information at least partly overlap, the transparency processing part 312 generates a bitmap with a size that includes overlapping plural areas. For example, the transparency processing part 312 generates a rectangular bitmap with the minimum size including plural areas.

The transparency processing part 312, when obtaining a drawing command from the drawing processing part 313, performs drawing if the drawing command is related to an area that overlaps with the generated bitmap area, but does not perform the drawing if the command is related to an area that does not overlap with the generated bitmap area.

For example, if the drawing command is of an area that includes the generated bitmap area, the transparency processing part 312 performs the drawing on the bitmap.

The transparency processing part 312, if obtaining a drawing command of a bitmap with an alpha channel, performs the alpha blending and performs the drawing on the bitmap. The transparency processing part 312 duplicates a transmissive area that shows an alpha blended bitmap area, and outputs the transmissive area to the drawing processing part 313.

With this, the printer driver 300 can allow the bitmap area for drawing in the printer driver to be minimum requirement.

<Operation>

Figure 10:
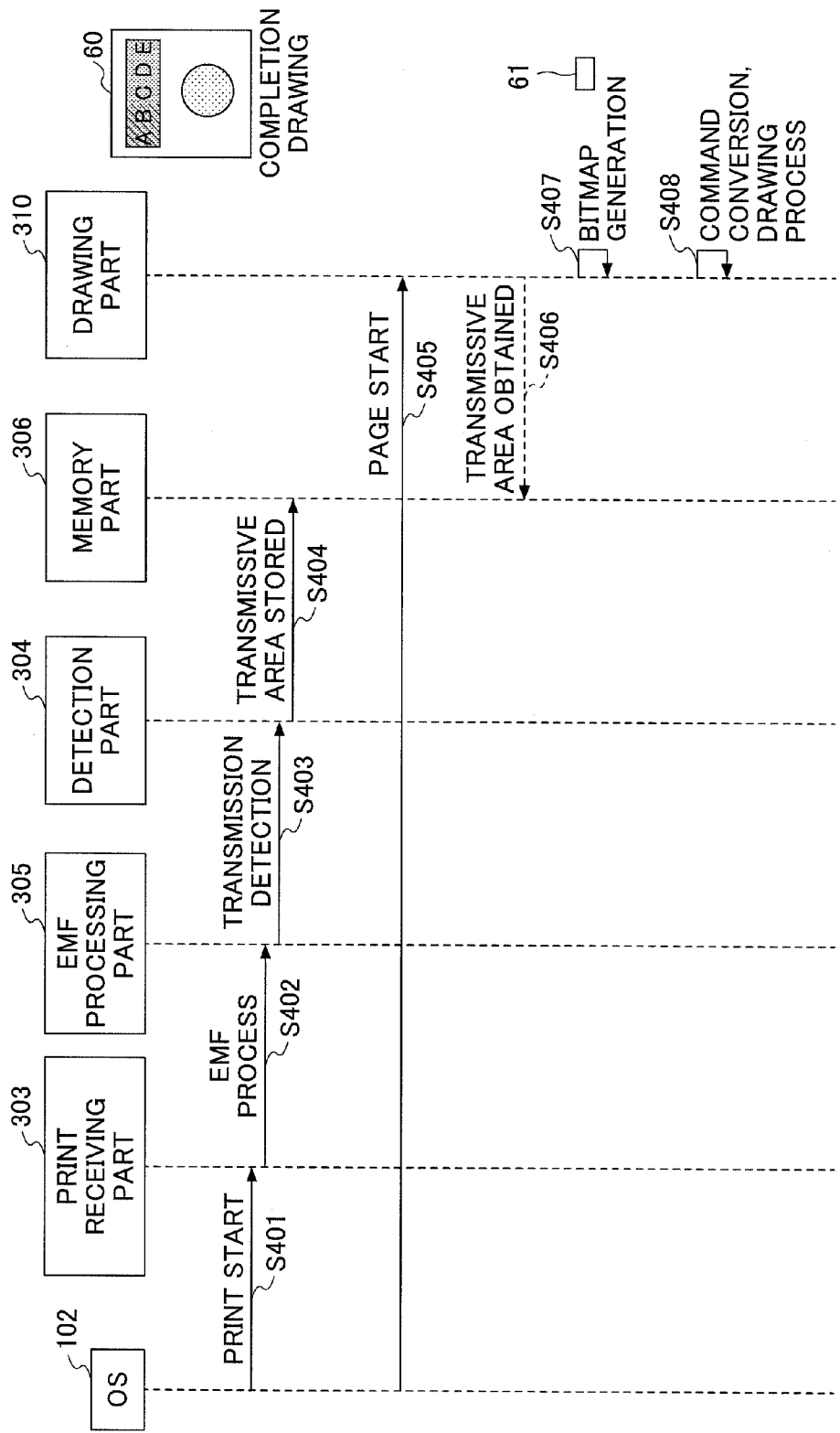
FIG. 10 is a sequence diagram showing an example of a print control process in the second embodiment.

Next, a description is given about an operation of the information processing apparatus in the second embodiment. FIG. 10 is a sequence diagram showing an example of a print control process in the second embodiment.

In step S401, the OS 102 sends a page start command to the print receiving part 303.

In step S402, the print receiving part 303 instructs the EMF processing part 305 to perform EMF processing for the EMF data. An EMF process is, for example, an imposition process and the like. At this time, the EMF processing part 305 performs the EMF process, if necessary.

In step S403, the EMF processing part 305 sends a transmission detection command to the detection part 304.

In step S404, the detection part 304 parses the EMF data, and retrieves an alpha blending command. The detection part 304, if detecting the alpha blending command, stores area information including drawing information such as a print location, a width, and a height of a bitmap with an alpha channel, and a page number in the memory part 306.

The memory part 306 stores one or more pieces of area information. For example, the memory part 306 stores drawing information of the bitmap with the alpha channel associated with the page number. If there are plural alpha blending commands, in other words, if there are plural transmissive areas, step S404 is repeated.

In step S405, if page processing by the print processor 302 is finished, the OS 102 sends a drawing command to the drawing part 310 in the printer driver 300. Page processing means processing including an EMF process, a storing process of the area information and the like.

In step S406, the drawing part 310 obtains the area information from the memory part 306 if receiving the page start command from the OS 102. For example, the drawing part 310 obtains drawing information of the bitmap with the alpha channel included in the page.

In step S407, the transparency processing part 312 of the drawing part 310 generates a bitmap 61 corresponding to the size (i.e., width and height) of the bitmap with the alpha channel from the drawing information obtained from the memory part 306. Though only one example is shown in FIG. 10, the transparency processing part 312 generates plural bitmaps if there are plural pieces of area information. In addition, the transparency processing part 312 generates a bitmap of minimum size that fits all the plural areas in.

An image 60 shown in FIG. 10 shows a printing result that the application 101 expects. An area to be alpha blended in the image 60 is generated in the transparency processing part 312 as a bitmap 61.

In step S408, the drawing part 310 performs a command conversion process and a drawing process. The command conversion process is processing that converts a drawing command into a print command. The drawing process includes a bitmap generation process and a drawing process to a bitmap. The drawing process by the drawing part 310 is similar to that in the first embodiment except the following two points.

First, when the transparency processing part 312 receives a drawing command, if a drawing area by the drawing command and the area of the bitmap 61 generated in step S407 overlap, the transparency processing part 312 performs a drawing corresponding to the drawing command on the bitmap 61. The transparency processing part 312 does not perform the drawing on the bitmap 61 if the drawing area by the drawing command and the area of the bitmap 61 do not overlap.

Second, the transparency processing part 312, if receiving a drawing command of a bitmap with an alpha channel (i.e., transmissive image), draws the bitmap with the alpha channel on the bitmap 61 in which the drawing areas overlap.

According to the above-mentioned process, a size of the bitmap generated inside the printer driver 300 can be reduced.

<Process Outline>

Figure 11:
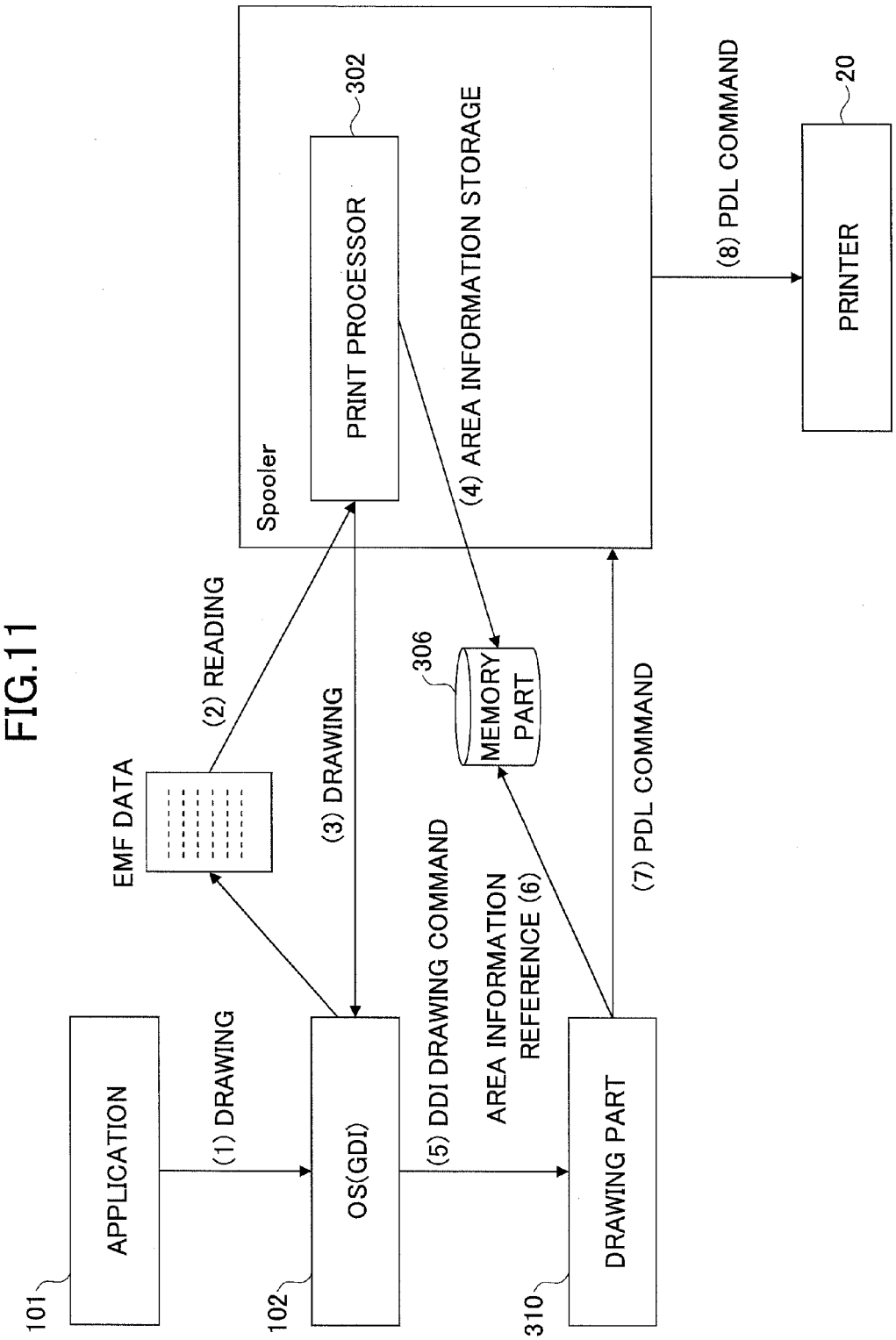
FIG. 11 is a diagram showing an outline of the print control process in the second embodiment.

FIG. 11 is a diagram showing an outline of a print control process in the second embodiment.

(1) An application 101 performs drawing to an OS (i.e., GDI: Graphic Device Interface) 102.

(2) The OS 102 generates EMF data (which may be called an "EMF spooling file"), and a spooler reads the EMF data.

(3) A print processor 302 performs drawing such as an imposition process by using the EMF data.

(4) The print processor 302 detects an alpha blending command from the EMF data, and stores area information of a transmissive area in a memory part 306. At this time, if a layout is changed by the imposition process and the like, area information showing a transmissive area after the layout has been changed, is stored.

(5) The OS (i.e., GDI) 102 sends a DDI (Drive Driver Interface) command to a drawing part 310.

(6) The drawing part 310 refers to the area information stored in the memory part 306, and generates a bitmap with an area size that the area information indicates.

(7) The drawing part 310 converts the drawing command from the OS 102 into a PDL command (i.e., print command) and outputs the PDL command to the spooler. The drawing part 310 performs drawing on the generated bitmap as necessary. The drawing part 310, if having alpha blended the drawn bitmap, converts the alpha blended area into the PDL command.

(8) The spooler sends the PDL command to a printer 20.

As discussed above, in accordance with the second embodiment, a bitmap area to be alpha blended can be reduced, and a memory area to store the bitmap can be reduced.

Modified Embodiment

The printer drivers 103 and 300 in the respective embodiments do not support the PDL of the bitmap with the alpha channel, but notifies the OS 102 that a bitmap with an alpha channel is receivable. By doing this, the printer drivers 103 and 300 can receive a drawing command of the bitmap with the alpha channel from the OS 102.

However, sometimes memory consumption or a processing delay to generate the bitmap may be avoided inside the printer drivers 103 and 300. In this case, for example, it is desired to perform the print control processing at a high speed. At this time, the printer drivers 103 and 300 are desired only to convert the drawing command obtained from the OS 102 into the print command.

Figure 2:
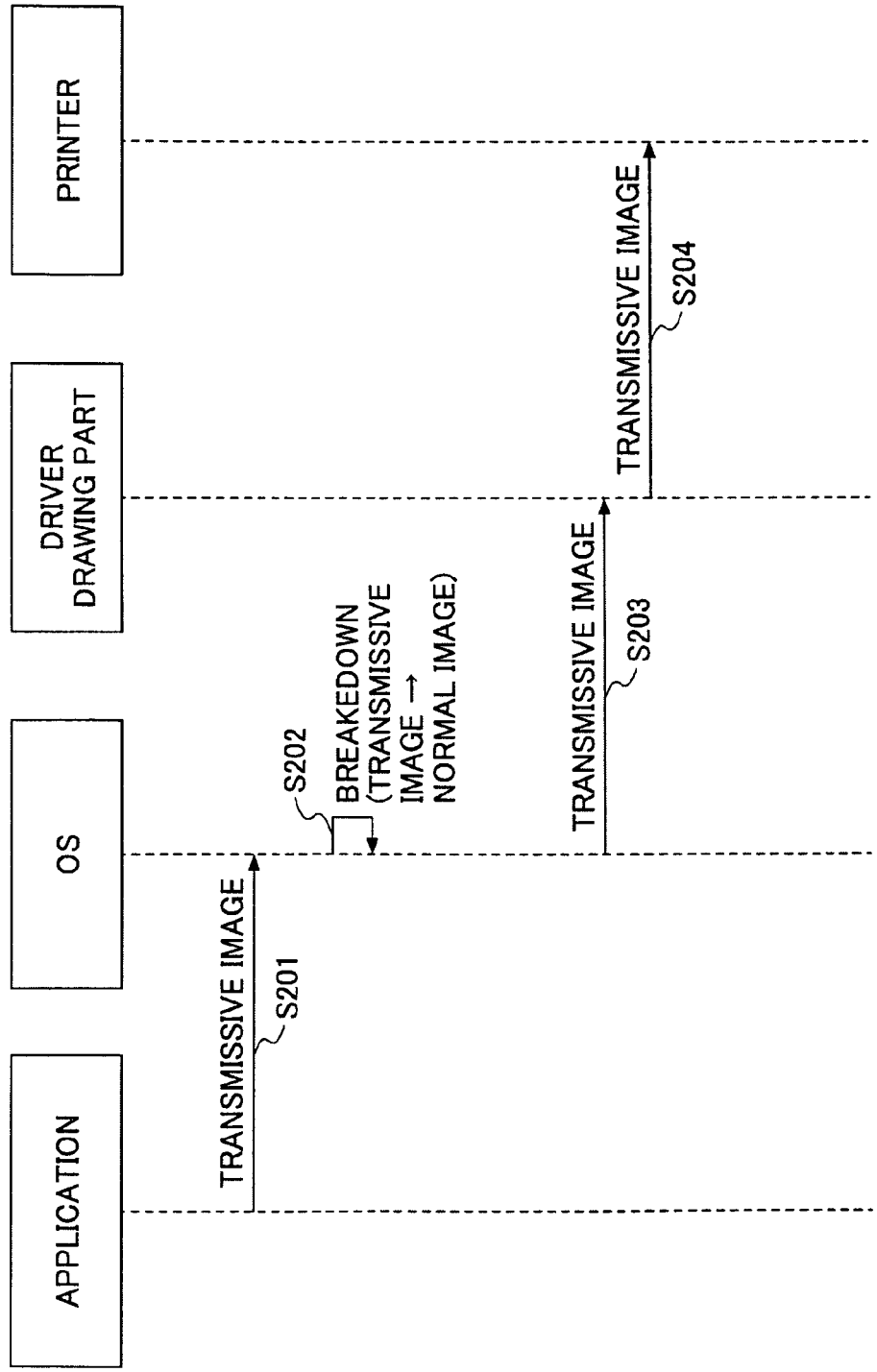
FIG. 2 is a sequence diagram showing an example of a print control process where a PDL not supporting a bitmap with an alpha channel is used.

Therefore, it may be better to be able to previously establish with the OS 102 that the printer drivers 103 and 300 notify the OS 102 whether or not the printer drivers 103, 300 can receive the bitmap with the alpha blending. If the printer drivers 103 and 300 notify the OS 102 that the printer drivers 103 and 300 cannot receive the bitmap with the alpha blending, for example, such as the print control process shown in FIG. 2, the drawing command not needing the alpha blending may be sent from the OS 102.

This makes it possible to allow a user to choose whether or not to make the printer driver 103 process the bitmap with the alpha blending.

A print control program executed by the information processing apparatus of the first and second embodiments is provided as a file with an installable format or an executable format by being recorded on a computer readable medium such as a CD-ROM, a flexible disc (i.e., FD), a CD-R, a DVD (i.e., Digital Versatile Disk) and the like.

Moreover, the print control program executed by the information processing apparatus of the first and second embodiments may be stored on a computer connected to a network such as the Internet and the like so as to provide the print control program through the network by being downloaded. Furthermore, the print control program executed by the information processing apparatus of the first and second embodiments may be provided or distributed through the network such as the Internet and the like.

In addition, the print control program executed by the information processing apparatus of the first and second embodiments may be provided by being incorporated in a ROM and the like.

The print control program executed by the information processing apparatus of the first and second embodiments has a module configuration including the above-mentioned respective parts. As actual hardware, by allowing the control part 11 (i.e., processor) to read and run a program from the auxiliary memory part 13, one or more respective parts among the above-mentioned parts are loaded in the main memory part 12, and one or more respective parts are generated in the main memory part 12.

As mentioned above, according to the embodiments of the present invention, it is possible to provide an information processing apparatus, an information processing method and a computer readable recording medium storing a print control program that can print a proper alpha blended image by properly performing an alpha blending process on a printer driver side even if the information processing apparatus, the information processing method and the computer readable recording medium are adapted to a printer that does not support the alpha blending process.

The present invention is not limited to the specifically disclosed embodiments, and variations and modifications may be made without departing from the scope of the present invention.

More specifically, the information processing apparatus, information processing method and a computer readable recording medium in the above-discussed respective embodiments are not limited to as is, and the information processing apparatus, the information processing method and the computer readable recording medium in the above-discussed respective embodiments can be implemented by modifying the components without departing from the scope of the present invention at the implementation phase. Moreover, by properly combining the plural components disclosed in the above-mentioned embodiments, various inventions can be formed. For example, some components may be removed from all of the components disclosed in the embodiments. Furthermore, components of different embodiments may be properly combined.

The present application is based on Japanese Priority Patent Application No. 2011-157176, filed on Jul. 15, 2011, the entire contents of which are incorporated herein by reference.

What is claimed is:

1. An information processing apparatus comprising:
a printer driver configured to,
receive a page start command and a plurality of drawing commands from an operating system (OS);
generate a bitmap upon receiving the page start command;
determine if any of the plurality of drawing commands includes at least one image with an alpha channel;
determine if the alpha channel indicates opacity;
if the printer driver determines that the at least one image with the alpha channel does not indicate opacity, the processor is further configured to,
combine the at least one image with a another image existing on the bitmap to generate an alpha blended image upon receiving the corresponding one of the plurality of drawing commands,
crop and duplicate the alpha blended image, and generate an alpha blended image without the alpha channel by converting the cropped and duplicated alpha blended image into an image without the alpha channel, and convert the corresponding one of the plurality of drawing commands that includes the at least one image with the alpha channel, into a print command to draw the image without the alpha channel; and if the printer driver determines that all of the plurality of drawing commands corresponding to images with alpha channel indicate opacity, the processor is configured not to crop and duplicate the at least one image, and is configured to convert the corresponding one of the plurality of drawing commands that includes the at least one image with the alpha channel into a print command by removing the alpha channel.

2. The information processing apparatus as claimed in claim 1, wherein the print driver includes a memory unit and is further configured to, receive a print command of Enhanced MetaFile (EMF) data from the OS; and detect an alpha blending command from the EMF data; and store area information showing information about an area to be alpha blended in the memory unit based on the alpha blending command, wherein the generated bitmap is a bitmap of only an area that corresponds to the area information.

3. The information processing apparatus as claimed in claim 2, wherein the printer driver is further configured to, store plural pieces of the area information in the memory part upon receiving plural alpha blending commands; and when plural areas shown by the plural pieces of the area information stored in the memory unit at least partly overlap, generate a rectangular bitmap including the plural areas.

4. The information processing apparatus as claimed in claim 2, wherein the printer driver is further configured to, perform an imposition process based on the EMF data, wherein the area information stored in the memory unit constitutes information that is stored after the printer driver performs the imposition process.

5. The information processing apparatus as claimed in claim 1, wherein the printer driver is configured to notify the OS of whether or not the print driver is capable of receiving images with alpha channel prior to receiving the plurality of drawing commands from the OS.

6. A non-transitory computer readable recording medium storing a print control program, which when executed by a computer, causes the computer to perform:

receiving a page start command and a plurality of drawing commands from an operating system (OS);

generating a bitmap upon receiving the page start command;

determining if any of the plurality of drawing commands includes at least one image with an alpha channel;

determining if the alpha channel indicates opacity;

upon determining that the at least one image with the alpha channel does not indicate opacity, combining the at least one image with another image existing on the bitmap to generate an alpha blended image upon receiving the corresponding one of the plurality of drawing commands, cropping and duplicating the alpha blended image, and generating an alpha blended image without the alpha channel by converting the cropped and duplicated alpha blended image into an image without the alpha channel, and converting the corresponding one of the plurality of drawing commands that includes the at least one image with the alpha channel, into a print command to draw the image without the alpha channel; and upon determining that all of the plurality of drawings commands corresponding to images with alpha channel indicate opacity, the print control program causes the computer to convert the corresponding one of the plurality of drawing commands that includes the at least one image with the alpha channel into a print command by removing the alpha channel without performing the cropping and duplicating of the at least one image.

7. An information processing method, comprising:

receiving a page start command and a plurality of drawing commands from an operating system (OS);

generating a bitmap upon receiving the page start command;

determining if any of the plurality of drawing commands includes at least one image with an alpha channel;

determining if the alpha channel indicates opacity;

upon determining that the at least one image with the alpha channel does not indicate opacity, combining the at least one image with a another image existing on the bitmap to generate an alpha blended image upon receiving the corresponding one of the plurality of drawing commands, cropping and duplicating the alpha blended image, and generating an alpha blended image without the alpha channel by converting the cropped and duplicated alpha blended image into an image without the alpha channel, and converting the corresponding one of the plurality of drawing commands that includes the at least one image with the alpha channel, into a print command to draw the image without the alpha channel; and upon determining that all of the plurality of drawings commands corresponding to images with alpha channel indicate opacity, converting the corresponding one of the plurality of drawing commands that includes the at least one image with the alpha channel into a print command by removing the alpha channel without performing the cropping and duplicating of the at least one image.

8. The information processing method as claimed in claim 7, further comprising:

receiving a print command of Enhanced MetaFile (EMF) data from the OS;

detecting an alpha blending command from the EMF data; and storing area information showing information about an area to be alpha blended in a memory unit based on the detected alpha blending command, wherein the generated bitmap is a bitmap of only the area shown by the area information stored in the memory unit is generated.

9. The information processing method as claimed in claim 8, wherein the storing stores plural pieces of the area information upon detecting plural alpha blending commands; and when plural areas shown by the plural pieces of the area information stored in the memory unit at least partly overlap, the generating the bitmap generates a rectangular bitmap including the plural areas.

10. The information processing method as claimed in claim 8, further comprising:
performing an imposition process based on the EMF data, wherein the storing stores the area information in the memory unit after the performing performs the imposition process.

11. The information processing method as claimed in claim 7, further comprising:
notifying the OS of whether or not a print driver that performs the information processing method is capable of receiving images with alpha channel prior to the receiving receiving the plurality of drawing commands from the OS.

12. A print control system, comprising,
the information processing apparatus of claim 2; and
a printer.

13. A print control system, comprising,
the information processing apparatus of claim 3; and
a printer.

14. A print control system, comprising,
the information processing apparatus of claim 4; and
a printer.

15. The information processing apparatus as claimed in claim 1, wherein the processing unit is configured to only convert an area of the image without the alpha channel, which corresponds to the at least one image with the alpha channel, to the drawing receiving unit.

* * * * *